(12) United States Patent
Upah et al.

(10) Patent No.: US 10,336,372 B1
(45) Date of Patent: Jul. 2, 2019

(54) VEHICLE FRAME AND VEHICLE HAVING SAME

(71) Applicant: Honda Motor Co., Ltd., Tokyo (JP)

(72) Inventors: Luke M. Upah, Williamsburg, IA (US); Daniel T. Sellars, West Liberty, OH (US); Dakota D. Kirtland, Dublin, OH (US); Matthew L. Taracko, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/876,551

(22) Filed: Jan. 22, 2018

(51) Int. Cl.
| | |
|---|---|
| *B62D 21/15* | (2006.01) |
| *B62D 21/02* | (2006.01) |
| *B60R 21/13* | (2006.01) |
| *B60R 16/02* | (2006.01) |
| *B62D 25/08* | (2006.01) |
| *B60R 19/26* | (2006.01) |

(52) U.S. Cl.
CPC .......... *B62D 21/15* (2013.01); *B60R 16/0207* (2013.01); *B60R 19/26* (2013.01); *B60R 21/13* (2013.01); *B62D 21/02* (2013.01); *B62D 25/088* (2013.01)

(58) Field of Classification Search
CPC .... B62D 21/15; B62D 21/02; B60R 16/0207; B60R 21/13
USPC ............................ 296/187.09, 187.1, 203.02
See application file for complete search history.

(56) References Cited

U.S. PATENT DOCUMENTS

| | | | |
|---|---|---|---|
| 8,066,315 B2 | 11/2011 | Suzuki et al. | |
| 8,303,030 B2 | 11/2012 | Baccouche et al. | |
| 8,419,111 B2 | 4/2013 | Uchida et al. | |
| 9,365,241 B1 | 6/2016 | Taracko et al. | |
| 9,493,191 B2 | 11/2016 | Kariniemi | |
| 9,604,673 B2 | 3/2017 | An et al. | |
| 9,623,912 B2 | 4/2017 | Schlangen | |
| 2011/0094816 A1 | 4/2011 | Suzuki et al. | |
| 2012/0193163 A1 | 8/2012 | Wimpfheimer et al. | |
| 2015/0061275 A1* | 3/2015 | Deckard | B60G 21/055 280/788 |
| 2015/0367890 A1 | 12/2015 | Kurokawa | |

FOREIGN PATENT DOCUMENTS

| | | |
|---|---|---|
| CN | 101138999 A | 3/2008 |
| EP | 2698274 A1 | 2/2014 |
| EP | 2958792 A2 | 12/2015 |
| WO | 2014130611 A2 | 8/2014 |

* cited by examiner

*Primary Examiner* — Joseph D. Pape
(74) *Attorney, Agent, or Firm* — Honda Patents & Technologies North America, LLC; Clifford B Vaterlaus

(57) ABSTRACT

A frame assembly for a vehicle can include a main frame assembly defining a passenger compartment, and a front frame assembly. The front frame assembly can include a pair of front frame members extending upwardly, and a pair of intermediate frame members spaced apart from each other in the transverse direction of the vehicle. Each of the intermediate frame members can be connected to a respective one of the front frame members. Each of the intermediate frame members also can be connected to a cross member of the main frame assembly, and can include a bend such that each of the intermediate frame members buckles in the longitudinal direction of the vehicle if a load or kinetic energy applied to each of the intermediate frame members in the longitudinal direction of the vehicle exceeds a predetermined threshold.

20 Claims, 10 Drawing Sheets

VEHICLE FRAME AND VEHICLE HAVING SAME

BACKGROUND

The disclosed subject matter relates to a vehicle and a frame assembly for the vehicle. More particularly, the disclosed subject matter relates to methods and apparatus that enhance load and energy management performance upon application of external loads and stresses, such as may occur during off-road travel over uneven terrain.

Vehicles, such as but not limited to all-terrain vehicles, can be subjected to relatively large load and/or energy inputs to the frame assembly due to the unevenness of the terrain across which the vehicle is travelling. The all-terrain vehicle can include a generally rigid frame assembly that is designed to withstand the load and energy inputs transmitted from the wheels and through the suspension components during travel over the uneven terrain. For example, space constraints and off-road durability may make it beneficial to provide very stiff portions of the vehicle frame that are spaced from the passenger area, such as but not limited to frame structures around the front suspension components, rear suspension components and/or powertrain components.

SUMMARY

Some embodiments are directed to a frame assembly for a vehicle that can include a main frame assembly and a front frame assembly. The main frame assembly can define a passenger compartment, and can include a pair of side frame members extending upwardly along a vertical direction of the vehicle from a respective one of each of the main frame members, and a cross frame member extending in the transverse direction from one of the side frame members to a different one of the side frame members. The front frame assembly can include a pair of front frame members, and a pair of intermediate frame members that can be spaced apart from each other in the transverse direction of the vehicle. Each of the intermediate frame members can be connected to and can extend from a respective one of the front frame members. Each of the intermediate frame members also can be connected to the cross member. Each of the pair of intermediate frame members can include a bend such that each of the intermediate frame members buckles in the longitudinal direction of the vehicle if a load or kinetic energy applied to each of the intermediate frame members in the longitudinal direction of the vehicle exceeds a predetermined threshold.

Some embodiments are directed to a vehicle that can include a main frame assembly, a rear frame assembly, and a front frame assembly. The main frame assembly can define a passenger compartment of the vehicle, and can include a pair of main frame members, a pair of side frame members, and a cross frame member. The main frame members can extend in a longitudinal direction of the vehicle, and can be spaced apart in a transverse direction of the vehicle. Each of the side frame members can be connected to and can extend upwardly along a vertical direction of the vehicle from a front end portion of a respective one of each of the main frame members. The cross frame member can extend in the transverse direction of the vehicle from one of the side frame members to a different one of the side frame members. The rear frame assembly can be connected to and can extend from a rear end portion of the main frame members in a longitudinal direction of the vehicle. The rear frame assembly can be configured to mount a rear suspension and wheel assembly. The front frame assembly can be connected to and can extend from a front end portion of the main frame assembly of the vehicle such that the main frame assembly extends between the front frame assembly and the rear frame assembly in a longitudinal direction of the vehicle. The front frame assembly can be configured to mount a front suspension and wheel assembly. The front frame assembly can include a pair of lower frame members, a pair of front frame members, and a pair of intermediate frame members. The lower frame members can be connected to the main frame assembly. The lower frame members can extend from the main frame assembly in the longitudinal direction of the vehicle. The lower frame members can be spaced apart from each other in the transverse direction of the vehicle. Each of the front frame members can be connected to and can extend upwardly from a respective one of the lower frame members. The intermediate frame members can be spaced apart from each other in the transverse direction of the vehicle. Each of the intermediate frame members can be connected to and can extend from a respective one of the front frame members. Each of the intermediate frame members also can be connected to the cross member. Each of the pair of intermediate frame members can include a bend such that each of the intermediate frame members buckles in the longitudinal direction of the vehicle if a load or kinetic energy applied to each of the intermediate frame members in the longitudinal direction of the vehicle exceeds a predetermined threshold.

Some embodiments are directed to an all-terrain vehicle that can include a main frame assembly, an instrument panel assembly, a rear frame assembly, and a front frame assembly. The main frame assembly can include a pair of main frame members, a roll cage, and a cross frame member. The main frame members can extend in a longitudinal direction of the vehicle, and can be spaced apart in a transverse direction of the vehicle. The roll cage can be connected to each of the main frame members at locations on each of the main frame members that are spaced apart in the longitudinal direction of the vehicle. The roll cage can be configured to define a passenger compartment. The roll cage can include a pair of cage side members, and each of the cage side members can be connected to and can extend upwardly along a vertical direction of the vehicle from a front end portion of a respective one of each of the main frame members. The cross frame member can extend in the transverse direction of the vehicle from one of the cage side members to a different one of the cage side members. The instrument panel assembly can be connected to the cross frame member and can extend in the transverse direction of the vehicle between the cage side members. The rear frame assembly can be connected to and can extend from a rear end portion of the main frame members in a longitudinal direction of the vehicle. The rear frame assembly can be connected to and can extend from a rear end portion of the roll cage. The rear frame assembly can be configured to mount a rear suspension and wheel assembly. The front frame assembly can be connected to and can extend from a front end portion of the main frame assembly of the vehicle such that the main frame assembly extends between the front frame assembly and the rear frame assembly in a longitudinal direction of the vehicle. The front frame assembly can be configured to mount a front suspension and wheel assembly. The front frame assembly can include a pair of lower frame members, a pair of front frame members, and a pair of intermediate frame members. The lower frame members can be connected to the main frame assembly. The lower frame members can extend from the main frame assembly in the longitudinal direction of the vehicle, The lower frame members can be spaced apart from each other in the transverse direction of the vehicle. Each of the front frame members can be connected to and can extend upwardly from a respective one of the lower frame members. The intermediate frame members can be spaced apart from each other in the transverse direction of the vehicle. Each of the intermediate frame members can be connected to and can extend from a respective one of the front frame members. Each of the intermediate frame members also can be connected to the cross member. Each of the pair of intermediate frame members can include a bend such that each of the intermediate frame members buckles in the longitudinal direction of the vehicle if a load or kinetic energy applied to each of the intermediate frame members in the longitudinal direction of the vehicle exceeds a predetermined threshold.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
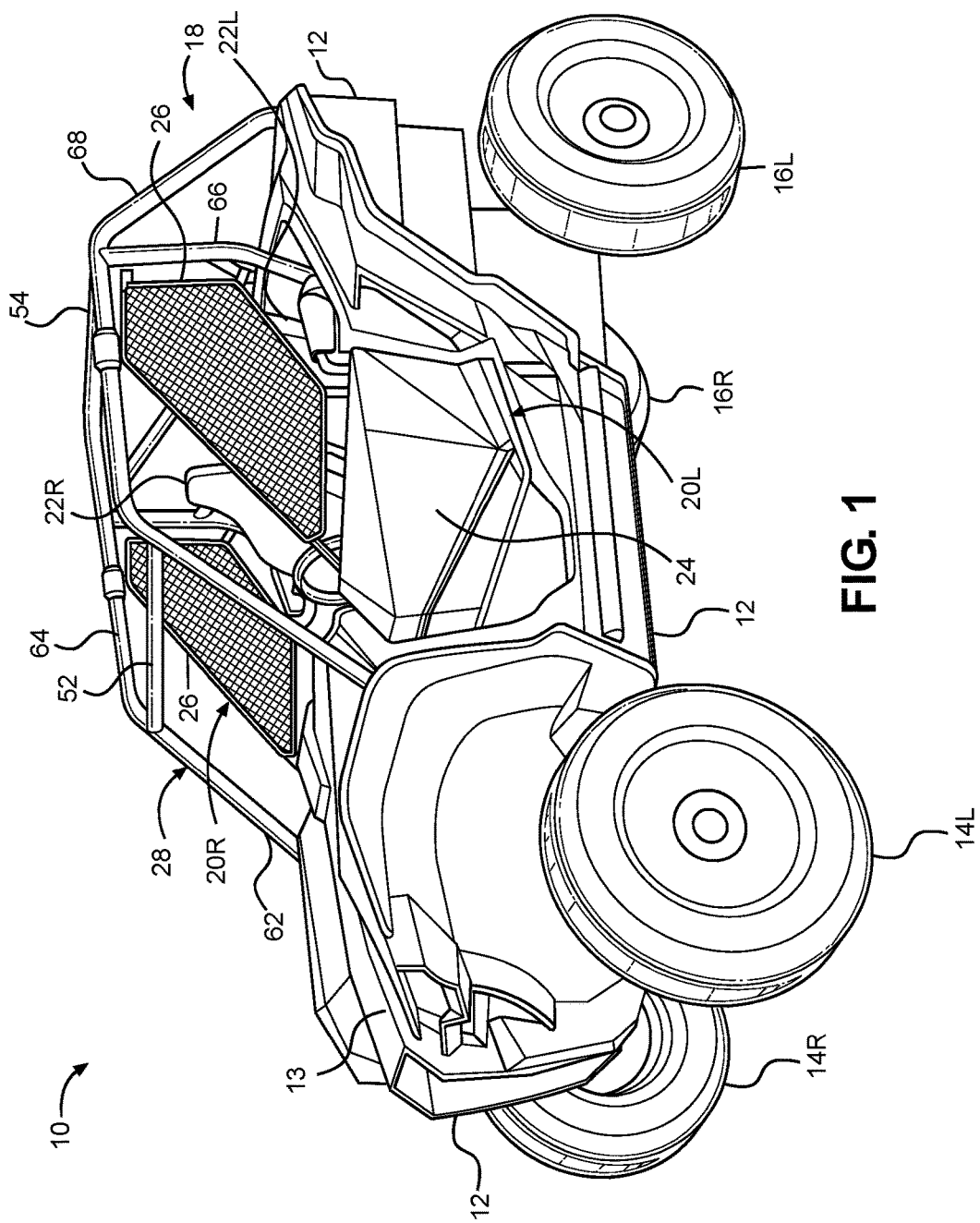
FIG. 1 is a perspective view of a vehicle made in accordance with principles of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle

Various vehicular design factors may make it challenging to sufficiently impede or prevent deformation of the vehicle frame defining the passenger area upon application of significant force inputs into the frame assembly. The stiff portions of the vehicle frame that are spaced from the passenger area, such as but not limited to frame structures around the front suspension components, rear suspension components and/or powertrain components, can transmit most of or the entire load or kinetic energy input to the portion of the vehicle frame defining the passenger area. Typical vehicle frame design constraints and requirements may also limit the use of structures for managing the input load or kinetic energy. As a result, the portion of the vehicle frame defining the passenger area can be subject to deformation due to the input load or kinetic energy.

It may therefore be beneficial to provide a vehicle and a frame for the vehicle with an apparatus that addresses at least one of the above and/or other challenges of related art vehicles. In particular, it may be beneficial to enhance input load and energy management performance upon application of an external load, such as by controlling deformation of the vehicle frame and/or mitigating energy transmission to the passenger area caused by the input load or kinetic energy. For example, portions of the vehicle frame assembly can be configured to absorb and transfer, in a predetermined controlled manner, the load or kinetic energy that originated from the input load or kinetic energy.

In some of these and/or other embodiments, the vehicle frame can be configured to deform at portions spaced from the passenger area. In addition, the frame can be configured with structures that can resist deformation during routine off-road usage of the vehicle, but that can deform in a predetermined controlled manner in response to an input load or kinetic energy. In some of the disclosed and/or other embodiments, the vehicle frame can be configured to deform in the vicinity of the passenger area in a predetermined controlled manner so that the dimensions of the passenger area after loading can be substantially the same as the dimensions of the passenger area prior to the input load or kinetic energy.

It may therefore be beneficial to provide a vehicle with a frame assembly that addresses at least one of the above and/or other disadvantages or concerns of the related art. In particular, it may be beneficial to utilize a frame assembly that is sufficiently rigid to cope with load and/or energy inputs from the suspension as the vehicle travels over uneven terrain of an unimproved path, and that is sufficiently deformable in a predetermined controlled manner in response to load and/or energy inputs different from those input by the suspension. For example, it may be beneficial to utilize a frame assembly that includes a front frame assembly that is configured to distribute loads and/or energy input by each suspension component throughout the entire frame assembly such that the suspension load and/or energy inputs can be transferred to a main frame assembly to which the front frame assembly can be connected.

FIG. 1 is a perspective view of an exemplary vehicle 10 including frame assembly 18 in accordance with the disclosed subject matter. The vehicle 10 shown in FIG. 1 is specialized for use on an unimproved path or on an unmarked path, and can be referred to as a multipurpose utility vehicle (MUV) or as a side-by-side all-terrain vehicle (SxS, or SxS ATV).

However, the disclosed vehicle frame assembly can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc.

Figure 2:
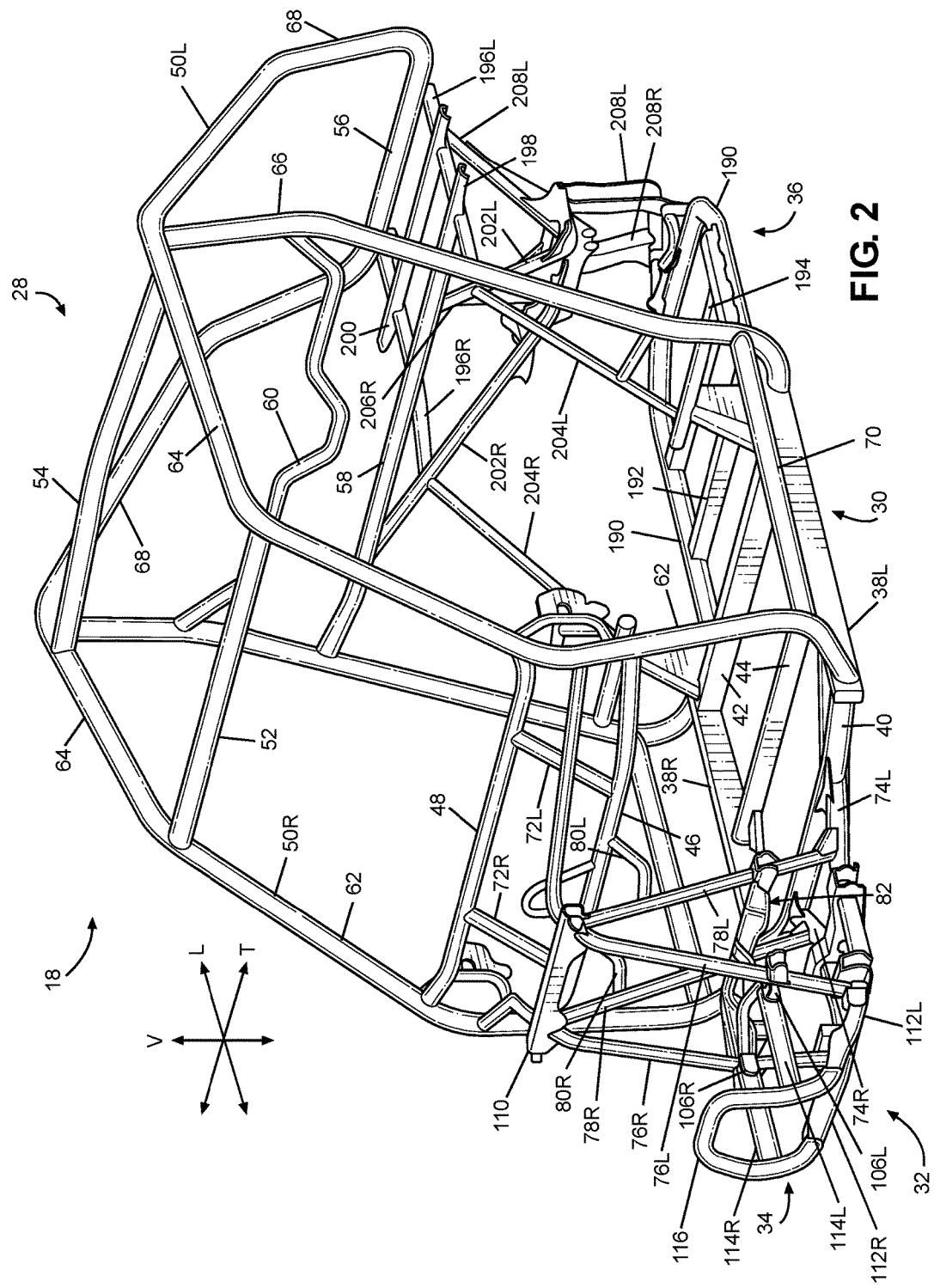
FIG. 2 is perspective view of a frame assembly of the vehicle of FIG. 1.

The vehicle 10 can include a body 12, a pair of front wheels, 14L, 14R, a pair of rear wheels 16L, 16R, a frame assembly 18, a pair of door assemblies 20L, 20R, and a powertrain. Portions of the frame assembly 18 are hidden from view in FIG. 1 by the body 12 (but are shown in FIG. 2), and the powertrain is omitted from FIG. 1 for simplicity and clarity of the drawing.

The vehicle 10 can include a pair of front seats 22L, 22R mounted in a passenger area of the vehicle 10. The frame assembly 18 can include a roll cage 28 configured to extend around and above the seats 22L, 22R and the passenger area. The roll cage 28 can cooperate with the body 12 and/or at least a portion of the frame assembly 18 to define a pair of door openings through which a passenger may pass in order to enter or exit the passenger area.

The door assemblies 20L, 20R, which occupy the door openings, each can include a door 24 and a window panel assembly 26, and can be configured to selectively open and close access through the door openings by moving between a closed position and a fully opened position. (The door 24 of the right-side door assembly 20R is obscured from view in FIG. 1). In the closed position, the door assemblies 20L, 20R, can span the respective door openings to obstruct access to the passenger area via the door openings. In the closed position, the front portion of each door assembly 20L, 20R can be latched to the roll cage 28. The fully opened position can be any position where the door assemblies 20L, 20R are pivoted away from the respective door openings to provide substantially unobstructed access to the passenger area via the door openings. FIG. 1 shows the door assemblies 20L, 20R in the closed position.

The powertrain can include an internal combustion engine, one or more electric motor(s) or a hybrid of an internal combustion engine and one or more electric motor(s), a hydrogen engine, or other known engine/motor. The powertrain can have the engine/motor output axis oriented in the longitudinal direction L or in the traverse direction T of the vehicle 10. The powertrain can be configured to drive only the front wheels 14L, 14R, or configured to drive only the rear wheels 16L, 16R, or configured to drive all of the wheels 14L, 14R, 16L, 16R, or configured to drive the rear wheels 16L, 16R and selectively drive the front wheels 14L, 14R, or configured to drive the front wheels 14L, 14 and selectively drive the rear wheels 16L, 16R. In the exemplary embodiment of FIG. 1, the powertrain is configured as a longitudinally oriented, rear-mounted internal combustion engine that drives the rear wheels 16L, 16R and selectively drives the front wheels 14L, 14R.

II. Frame Assembly

FIG. 2 is a perspective view of the frame assembly 18. The frame assembly 18 can be configured to support the body 12, door assemblies 20L, 20R, seats 22L, 22R, suspension components for the wheels 14L, 14R, 16L, 16R, powertrain, steering system, control pedal assemblies, passengers and cargo items. The frame assembly 18 can be configured to withstand various modes of operation, including operation on unimproved paths. As will be discussed in greater detail below, the frame assembly 18 can be configured to surround the passenger area.

The frame assembly 18 can include a main frame assembly 30, a front frame assembly 32, a front bumper assembly 34 and a rear frame assembly 36. As will be discussed in greater detail below, a load and energy management apparatus can distribute loads input by the front suspension on one side of the front frame assembly 32 to the other side of the front frame assembly 32. Further, the load and energy management system can distribute and attenuate loads and energy throughout the front frame assembly 32 that are applied to the front bumper assembly 34 to thereby manage the energy so that any deflection of the frame assembly 18 in the vicinity of the passenger area can be controlled in an advantageous predetermined manner.

The main frame assembly 30 can define the passenger area of the vehicle 10. The main frame assembly 30 can be configured to provide an overall bending stiffness and torsional stiffness of the vehicle 10 that can be advantageous for rugged terrain of an unimproved path.

The front frame assembly 32 can be connected to the front end of the main frame assembly 30. The front frame assembly 32 can be configured with mounting points for the front suspension components and any appropriate components/systems, such as but not limited to portions of the body 12, a front final drive assembly, steering system components, engine cooling system, headlights, etc.

The front bumper assembly 34 can be connected to the front end of the front frame assembly 32, such that the front frame assembly 32 can be located between the front bumper assembly 34 and the main frame assembly 30. The front bumper assembly 34 can extend beyond the exterior of the body 12, or alternatively, one or more portions of the body 12 can conceal the front bumper assembly 34.

The main frame assembly 30, front frame assembly 32, front bumper assembly 34 and rear frame assembly 36 can be made from any appropriate structural element(s), such as but not limited to tubes, beams, stampings, etc., that can provide sufficient strength and rigidity for a vehicle passenger area. The frame assembly 18 can be formed from a single type of structural element, or alternatively the frame member 18 can be formed from any combination of these structural elements. The structural elements can have any appropriate cross-sectional shape, such as but not limited to circular, rectangular, regular polygonal, irregular polygonal, hollow, solid, variable along the length of the structural element, etc.

The structural elements can be formed by any appropriate process, such as but not limited to rolling, hydroforming, bending, welding, extruding, stamping, any combination of these processes, etc. Each structural element of the frame assembly 18 can be formed from any appropriate material, such as but not limited to steel, aluminum, titanium, magnesium, plastic, fiber-reinforced plastic, carbon fiber, ceramic, a composite formed from any combination of these exemplary materials, etc. Each structural element of the frame assembly 18 can be connected to each adjoining structural element in any appropriate manner, such as but not limited to mechanical fasteners, welding, adhesive, any combination thereof, etc.

A. Main Frame Assembly

The main frame assembly 30 can define the passenger area and can include the roll cage 28, a pair of longitudinal members 38L, 38R, a plurality of lower cross members 40, 42, 44, a pair of upper cross members 46, 48 and a pair of support members 72L, 72R.

The longitudinal members 38L, 38R can extend in the longitudinal direction L of the vehicle 10, from the front of the passenger area to the rear of the passenger area. The longitudinal members 38L, 38R can each be configured as a substantially straight, hollow beam having a substantially rectangular cross-sectional shape.

The first through third lower cross members 40, 42, 44 can extend in the transverse direction T of the vehicle 10, from the left longitudinal member 38L to the right longitudinal member 38R. The first lower cross member 40 can be slightly bent along the longitudinal direction L near each end toward the rear of the vehicle 10. The first lower cross member 40 can be a hollow tube having a substantially circular cross-sectional shape. The second and third lower cross members 42, 44 can be configured as a substantially straight, hollow beam having a substantially rectangular cross-sectional shape.

The first lower cross member 40 can be connected to each of the longitudinal members 38L, 38R adjacent a respective front end of the longitudinal members 38L, 38R. The second lower cross member 42 can be connected to each of the longitudinal members 38L, 38R adjacent a respective rear end of the longitudinal members 38L, 38R. The third lower cross member 44 can be connected to each of the longitudinal members 38L, 38R at a portion of the longitudinal members 38L, 38R intermediate the front and rear ends of the respective longitudinal members 38L, 38R. In the exemplary embodiment of FIG. 2, welds can connect the lower cross members 40, 42, 44 to the longitudinal members 38L, 38R.

The first and second upper cross members 46, 48 can extend in the transverse direction T of the vehicle 10 from the left cage side assembly 50L to the right cage side assembly 50R. The first upper cross member 46 can be spaced away from the second upper cross member 48. The second upper cross member 48 can be connected to the cage side assemblies 50L, 50R at a position that is higher in the vertical direction V of the vehicle 10 than the position at which the first upper cross member 46 is connected to the side assemblies 50L, 50R.

The support members 72L, 72R can extend generally in the vertical direction V of the vehicle 10 from the first upper cross member 46 to the second upper cross member 48. The support member 72L, 72R can be spaced apart from each other in the transverse direction T of the vehicle 10. The support members 72L, 72R can each be configured as a hollow tube having a substantially circular cross-sectional shape. In the exemplary embodiment of FIG. 2, welds can connect the support members 72L, 72R to the upper cross members 46, 48.

Figure 6:
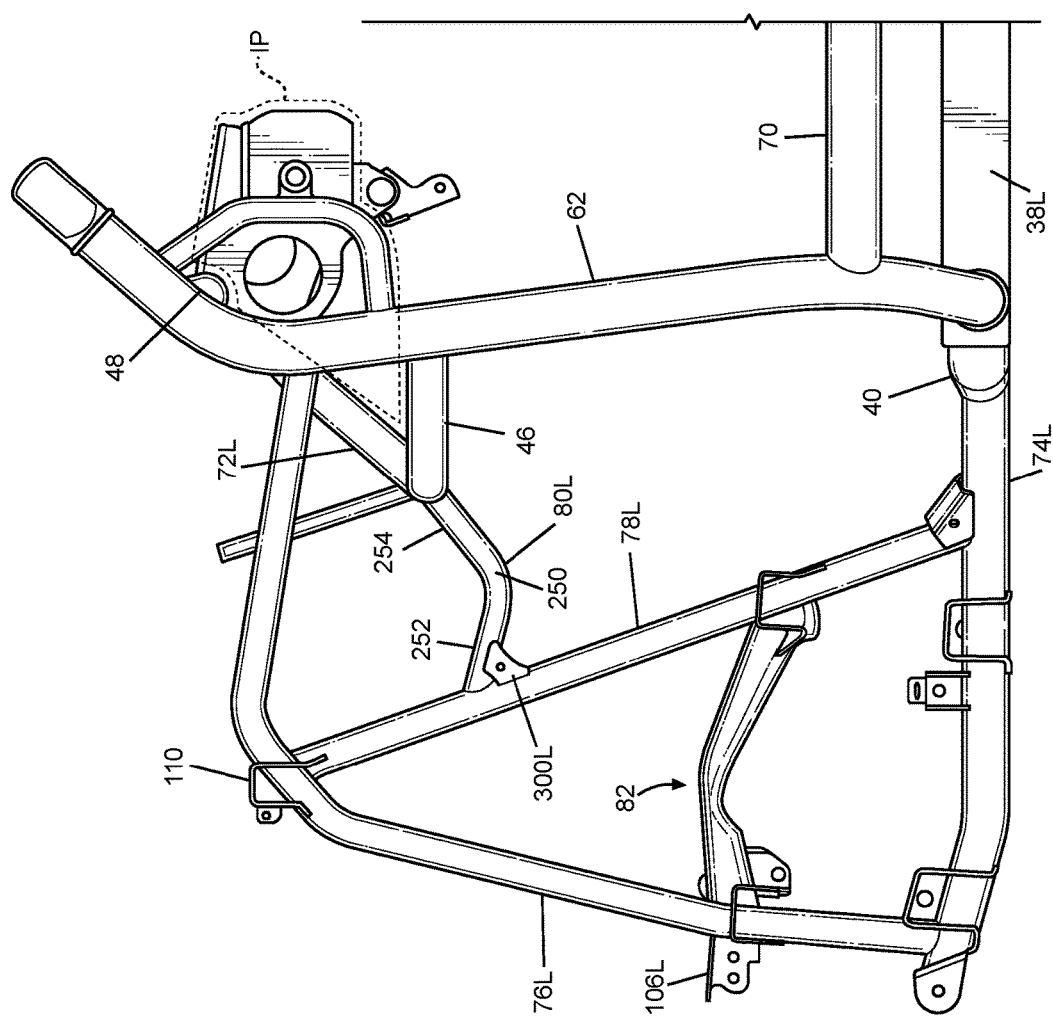
FIG. 6 is a side view of a front portion of the frame assembly of FIG. 2.

The upper cross members 46, 48 and the support members 72L, 72R can be configured to support and secure a panel assembly (such as but not limited to an instrument panel assembly 248 shown schematically and in phantom in FIG. 6), a steering assembly, and/or a portion of the body 12 (such as but not limited to a hood panel 13—see FIG. 1).

The instrument panel assembly 248 (also referred to as a dashboard assembly) can include one or more displays that indicates at least one operating condition of the vehicle 10 such as but not limited to vehicle speed, engine speed, engine coolant temperature, oil temperature, oil pressure, fuel level, battery charge level, etc. The instrument panel assembly 248 can be connected to either one or both of the cross members 46, 48. The instrument panel assembly 248 can extend in the transverse direction T of the vehicle 10.

The roll cage 28 can include a pair of cage side assemblies 50L, 50R, a plurality of cage cross members 52, 54, 56, 58, 60. The roll cage 28 generally defines the passenger compartment.

The cage side assemblies 50L, 50R can extend in the longitudinal direction L of the vehicle 10, from the front end of the passenger area to the rear end of the passenger area. The cage side assemblies 50L, 50R can define the limits of the passenger area in the transverse direction T of the vehicle 10, the longitudinal direction L of the vehicle 10 and in the vertical direction V of the vehicle 10. The cage side assemblies 50L, 50R can be configured to support the door assemblies 20L, 20R and any appropriate portion(s) of the body 12, such as but not limited to flexible side panel(s) (transparent, opaque, or a combination thereof), rigid side panel(s), roof panel (rigid or flexible), flexible or rigid rear panel (transparent, opaque, or a combination thereof), etc. The cage side assemblies 50L, 50R can be configured to resist, impede, or minimize deformation that could be caused by a load or kinetic energy input into either or both of the cage side assemblies.

Each of the cage side assemblies 50L, 50R can be formed from any appropriate number of structural elements, from one to any number greater than one. The side cage assemblies 50L, 50R can be configured with any shape and contour that can be advantageous to meet the structural performance and aesthetic appeal desired for the vehicle 10. The following description will be directed toward the left cage side assembly 50L with the understanding that the right cage side assembly 50R can be a mirror image of the left cage side assembly 50L.

The left cage side assembly 50L can include a plurality of cage side members 62, 64, 66, 68, 70. Each of the first through fifth cage side members 62, 64, 66, 68, 70 can be configured as a hollow tube having a substantially circular cross-section shape. The cage side members 62, 64, 66, 68, 70 can be configured with any appropriate elongated shape that can provide the desired dimensionality of the passenger area and advantageously conform to the aesthetic appearance desired for the vehicle 10.

The first cage side member 62 can be referred to as an A-pillar. The first cage side member 62 can be connected at one end to the left longitudinal member 38L adjacent the front end of the left longitudinal member 38L such that the first cage side member extends upwardly from the left longitudinal member 38L generally along the vertical direction V of the vehicle 10. The first cage side member 62 can be connected to a side of the left longitudinal member 38L that can be opposite to the side to which the first cross member 40 is connected. The one end of the first cage side member 62 can be aligned in the transverse direction T with the end of the first cross member 40 that is connected to the left longitudinal member 38L. The instrument panel 248 can extend in the transverse direction T of the vehicle 10 between the first cage side members 62.

Each of the upper cross members 46, 48 can be connected to a middle portion of the first cage side member 62 of each of the cage side assemblies 50L, 50R.

The third cage side member 66 can be referred to as a B-pillar. The third cage side member 66 can be connected at one end to the left longitudinal member 38L adjacent the rear end of the left longitudinal member 38L. The third cage side member 66 can be connected to a side of the left longitudinal member 38L that can be opposite to the side to which the second lower cross member 42 is connected. The one end of the third cage side member 66 can be aligned in the transverse direction T with the end of the second cross member 42 that is connected to the left longitudinal member 38L.

The first through fifth cage cross members 52, 54, 56, 58, 60 can extend in the transverse direction T of the vehicle 10 from the left side assembly 50L to the right side assembly 50R. The cage cross members 52, 54, 56, 58, 60 can be connected to each of the side assemblies 50L, 50R at respective locations spaced apart along the longitudinal direction L of the vehicle 10. The cage cross members 52, 54, 56, 58, 60 can be configured to maintain a predetermined spacing between the left cage side assembly 50L and the right cage side assembly 50R in the transverse direction T. The cage cross members 52, 54, 56, 58, 60 can define the limits of the passenger area in the longitudinal direction L of the vehicle 10 and the vertical direction V of the vehicle 10. The cage cross members 52, 54, 56, 58, 60 can be configured to manage load and/or energy inputs so that deflection of the frame assembly 18 in the vicinity of the passenger area can be controlled in an advantageous predetermined manner. In the exemplary embodiment of FIG. 2, the cage cross members 52, 54, 56, 58, 60 can be connected to the cage side assemblies 50L, 50R by welding.

B. Front Frame Assembly

Referring to FIG. 2, the front frame assembly 32 can be connected to the first lower cross member 40 and each of the first cage side members 62 of the main frame assembly 30. The front frame assembly 32 can include the front bumper assembly 34, a pair of front lower members 74L, 74R, a pair of first front members 76L, 76R, a pair of second front members 78L, 78R, a pair of intermediate frame members 80L, 80R and a transverse frame assembly 82.

Figure 3:
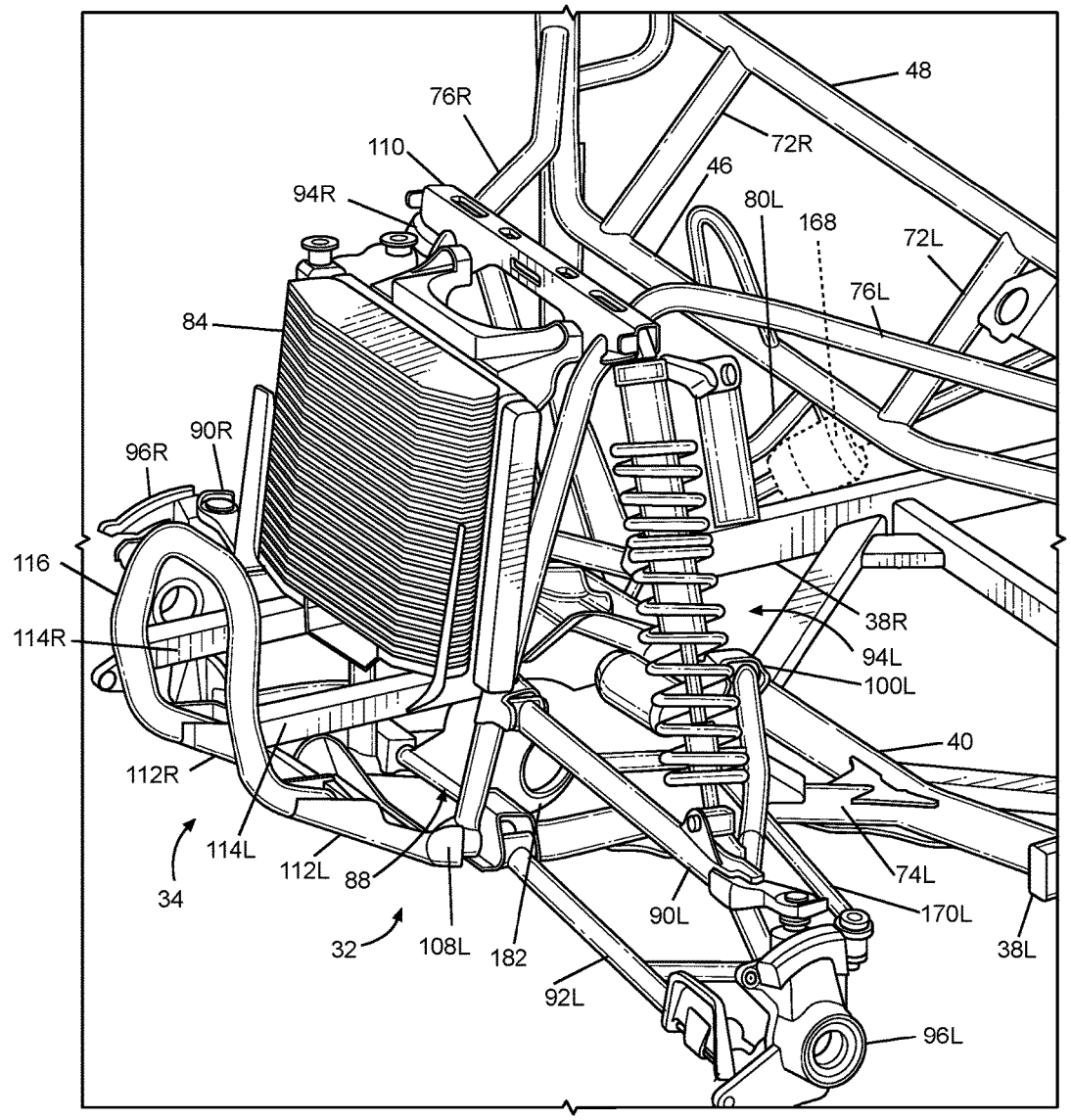
FIG. 3 is a partial perspective view of the frame assembly of FIG. 2 and attached components of the vehicle of FIG. 1.

The front frame members 76L, 76R, 78L, 78R can be spaced apart from each other in the transverse direction T of the vehicle 10 by a predetermined distance sufficient to accommodate any component(s) and/or system(s) to be supported by the front frame assembly 32. Referring to FIG. 3, the front frame assembly 32 can be configured to support a front suspension and wheel assembly, a radiator 84, a steering rack assembly and a front final drive assembly 88. The front suspension and wheel assembly can include suspension members 90L, 90R, 92L, 92R, damper and spring assemblies 94L, 94R, front hub assemblies 96L, 96R and the front wheels 14L, 14R.

Each of the second front frame members 78L, 78R can be connected to each of a respective one of the first front frame members 76L, 76R and a respective one of the front lower frame members 74L, 74R. For example, a first end of each of the second front frame members 78L, 78R can be connected to the respective one of the lower frame members 74L, 74R, and a second end of each of the second front frame members 78L, 78R can be connected to the respective one of the first front frame members 76L, 76R.

The intermediate members 80L, 80R can extend from and can be connected to a respective one of the second front frame members 78L, 78R, and can extend from and can be connected to the first upper cross member 46. Each of the intermediate frame members 80L, 80R can be connected to a respective one of the second front frame members 78L, 78R at a location that is between the first end and the second end of the respective one of the second front frame members 78L, 78R. Each of the intermediate frame members 80L, 80R can be welded or otherwise connected to the first upper cross member 46 and to the respective one of the second front frame members 78L, 78R.

In the exemplary embodiments of FIGS. 2-10, the intermediate frame members 80L, 80R are connected to the respective second front frame members 78L, 78R at a location that is closer to the second end than the first end of the respective one of the second front frame members 78L, 78R. However, exemplary embodiments are intended to include or otherwise cover the intermediate frame members 80L, 80R connected to the second front frame members 78L, 78R at any appropriate location at which the intermediate frame members 80L, 80R can deform in a predictable and controlled manner, which deformation is described in detail below.

The transverse frame assembly 82 can extend in the longitudinal direction L, the transverse direction T and the vertical direction V. Referring to FIGS. 2, 4, 6, and 7, the transverse frame assembly 82 can be connected to and extend from each of the first and second frame members 76L, 76R, 78L, 78R. The transverse frame assembly 82 can be configured to cooperate with the front final drive assembly 88 to transfer load or kinetic energy inputs from the front suspension and wheel assembly into each of the front lower frame members 74L, 74R, which in turn, can be configured to transfer the load or kinetic energy input into the first lower cross member 40 of the main frame assembly 30. Further, the transverse frame assembly 82 can be configured to collapse in the longitudinal direction L of the vehicle 10 in response to a load or kinetic energy input to the transverse frame assembly via the front bumper assembly 34.

The front frame assembly 32 can include a plurality of mounting brackets that can connect the front suspension and wheel assembly, the radiator 84, and the front bumper assembly 34 to the front frame assembly 32. The front suspension and wheel assembly can be movably connected to each of the suspension brackets so that the suspension members 90L, 90R, 92L, 92R can pivot relative to the suspension brackets and the front wheels 14L, 14R can move generally in the vertical direction V of the vehicle 10 as the vehicle 10 travels along an improved or unimproved pathway. The front bumper assembly 34 can be connected to each of the bumper brackets 106L, 106R, 108L, 108R.

The front frame assembly 32 can include an upper bracket 110. The upper bracket 110 can be connected to and extend from each of the first frame members 76L, 76R. The upper bracket 110 can extend in the transverse direction T of the vehicle 10 to span from the left first frame member 76L to the right first frame member 76L.

Referring to FIG. 3, an upper end of each of the spring and damper assemblies 94L, 94R can be connected to a respective end of the upper bracket 110 in an appropriate manner such as but not limited to threaded fasteners.

Figure 7:
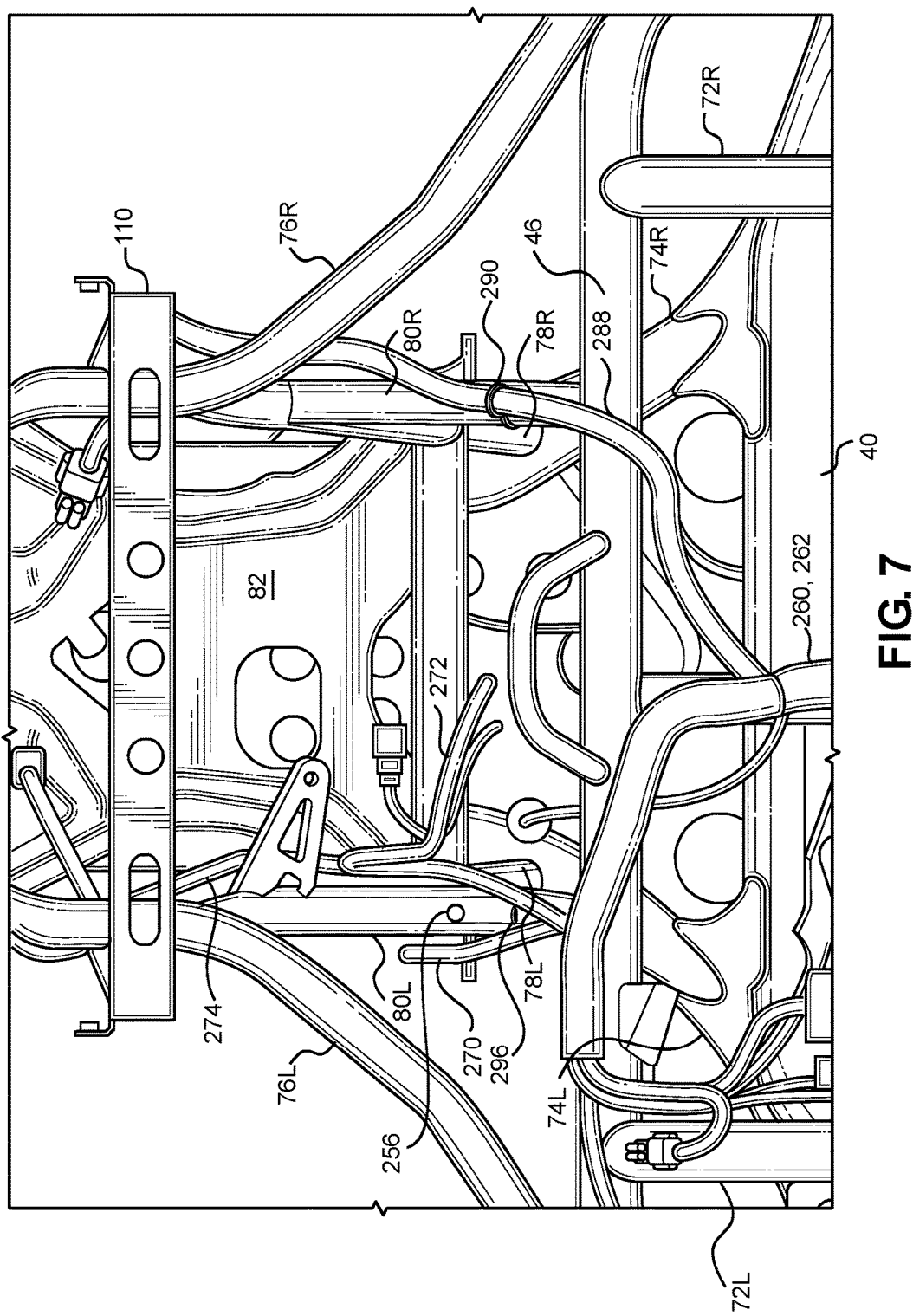
FIG. 7 is a top plan view of a front portion of the frame assembly of FIG. 2 with wires of an exemplary wire harness assembly connected to the frame assembly.

In the exemplary embodiment of FIG. 7, each of the front lower frame members 74L, 74R, the first front frame members 76L, 76R, the second front frame members 78L, 78R and the intermediate frame members 80L, 80R are configured as hollow metal tubes having a substantially circular cross-section. However, any combination of the front lower frame members 74L, 74R, the first front frame members 76L, 76R, the second front frame members 78L, 78R and the intermediate frame members 80L, 80R can be have a cross-sectional shape that is different from a substantially circular cross-sectional shape. Further, any combination of the front lower frame members 74L, 74R, the first front frame members 76L, 76R, the second front frame members 78L, 78R and the intermediate frame members 80L, 80R can be formed of a material other than metal, such as but not limited to carbon fiber, plastic, carbon fiber reinforced plastic, ceramic, pulp, or glass fiber reinforced plastic.

Further, the front lower frame members 74L, 74R, the first front frame members 76L, 76R, the second front frame members 78L, 78R and the intermediate frame members 80L, 80R can be welded to each other to form the structure described above. However, embodiments are intended to include or otherwise cover any combination of the front lower frame members 74L, 74R, the first front frame members 76L, 76R, the second front frame members 78L, 78R and the intermediate frame members 80L, 80R connected by threaded fasteners, adhesives, a combination of brackets and threaded fasteners, rivets, or other known connective structures, materials, or methods.

The front frame assembly 32 can include a pair of upper bumper brackets 106L, 106R and a pair of lower bumper brackets 108L. (The upper bumper brackets 106L, 106R are shown in phantom in FIGS. 7-9, 12, 13 and 15).

C. Front Bumper Assembly

The front frame assembly 32 can include the front bumper assembly 34. Referring to FIGS. 2 and 3, the front bumper assembly 34 can be connected to the front side of the first frame members 76L, 76R, such that the first and second frame members 76L, 76R, 78L, 78R are located between or intermediate the front bumper assembly 34 and the main frame assembly 30.

The front bumper assembly 34 can include a pair of lower connector members 112L, 112R, a pair of upper connector members 114L, 114R and a bumper member 116. The bumper member 116 can be a separate structure connected to each of the connector members 112L, 112R, 114L, 114R, or can all be integrated together into a single structure. The bumper member 116 can extend in the transverse direction T of the vehicle 10 to span from the left upper connector member 114L to the right upper connector member 114R.

A first end of each of the lower connector members 112L, 112R can be connected to a respective one of the lower bumper brackets 108L, 108R. Lower connector members 112L, 112R can be connected to the respective one of the bumper brackets such that the lower bumper brackets 108L, 108R can pivot with respect to the lower bumper brackets. The second end of the lower connector members 112L, 112R can be connected to the bumper member 116.

A first end of the upper connector members 114L, 114R can be connected to a respective one of the upper bumper brackets 106L, 106R. The second end of the upper connector members 114L, 114R can be connected to the bumper member 116.

The upper connector members 114L, 114R can be configured to deform in a predetermined and controlled manner in response to load or kinetic energy input to the bumper member 116 that exceeds a predetermined threshold. For example, the upper connector members 114L, 114R can be configured to collapse along the length of the upper connector members 114L, 114R. That is, the upper connector members 114L, 114R can be formed from any material and/or with any structure that can promote the desired deformation. By way of example only, FIGS. 2 and 3, show the upper connector members 114L, 114R as elongate members having a rectangular cross-sectional shape. Further, by way of example only, the upper connector members 114L, 114R can include one or more holes, cutouts, corrugated regions, bends, any combination thereof, etc., that can permit the upper connector members 114L, 114R to deform in a predetermined and controlled manner during an impact event.

The lower connector members 112L, 112R can pivot relative the lower bumper brackets 1081, 108R as the upper connector members 114L, 114R collapse. However, exemplary embodiments are intended to include any appropriate connection that can achieve the desired performance of the bumper assembly 34 in response to a load and/or energy that exceeds a predetermined threshold. The predetermined threshold can be set at a value where only the front bumper assembly 34 is subjected to deformation by the load or kinetic energy input to the bumper member 116, without deformation to the front frame assembly 32 or the main frame member 30.

The bumper member 116 can be configured with any appropriate shape and dimensions that can achieve the desired performance of the front bumper assembly 34 in response to the load or kinetic energy input.

Figure 4:
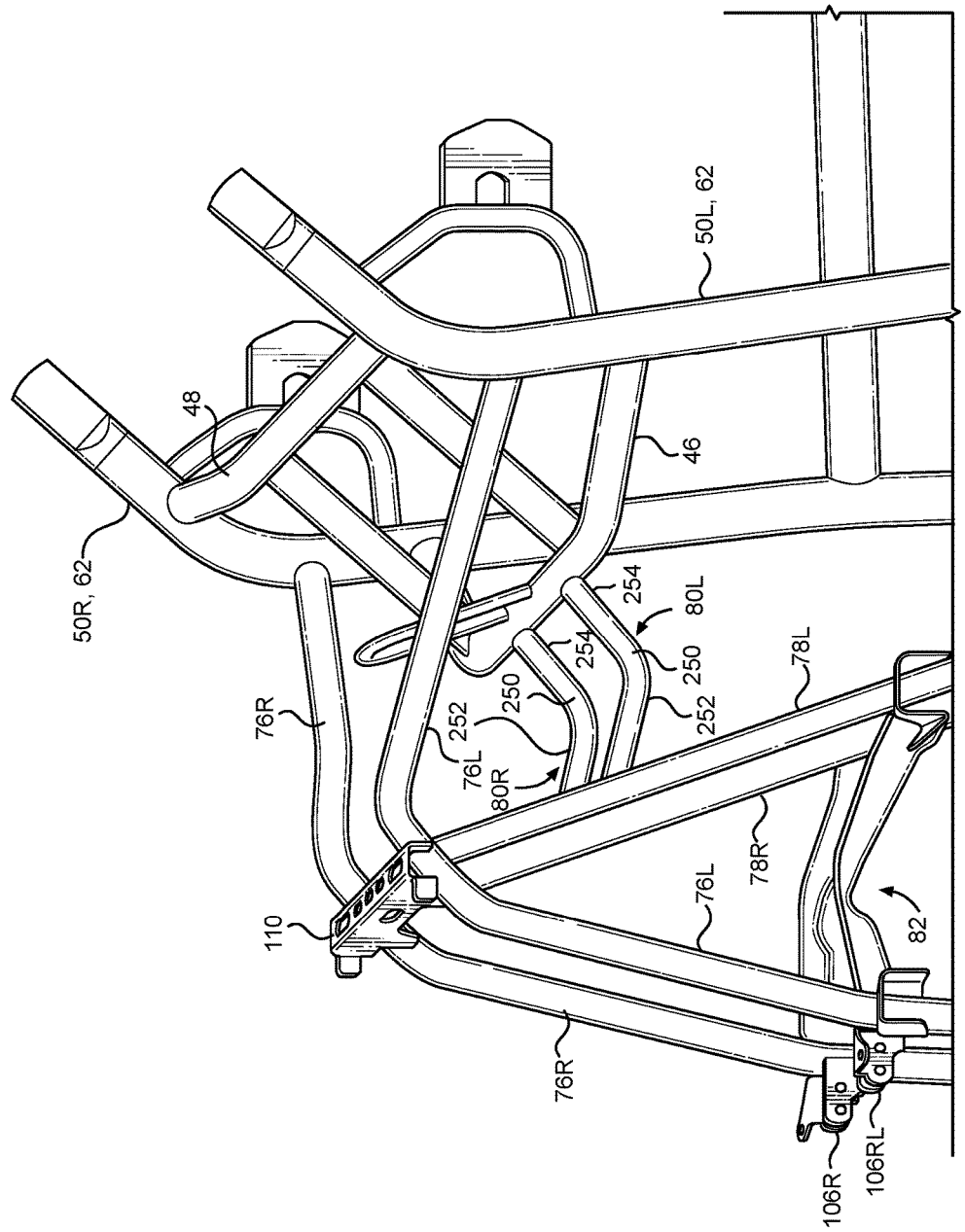
FIG. 4 is a perspective view of the front portion of the frame assembly of FIG. 2.

Referring to FIGS. 4 and 6, the upper bumper brackets 106L, 106R can include a flange to which a bottom of the radiator 84 can be connected in any appropriate manner such as but not limited to threaded fasteners, rivets, and welding. In an exemplary embodiment, each of the upper bumper brackets 106L, 106R can include a hole and the radiator 84 can include a pair of posts. A rubber grommet can be secured in each bracket hole. The radiator posts can be inserted into the grommets and the top end of the radiator 84 can be bolted to an appropriate portion of the front frame assembly 32.

D. Rear Frame Assembly

Referring to FIG. 2, the rear frame assembly 36 can include a plurality of rear frame members 190, 192, 194, 196L, 196R, 198, 200, 202L, 202R, 204L, 204R, 206L, 206R, 208L, 208R. The rear frame members 190, 192, 194, 196L, 196R, 198, 200, 202L, 202R, 204L, 204R, 206L, 206R, 208L, 208R can be configured to define a lower cradle assembly, an upper bed support assembly, and a suspension support assembly. The lower cradle assembly can be configured to mount and supporting the power source and a portion of the rear suspension and wheel assembly in any appropriate manner. The upper bed support can be configured to support a storage area of the vehicle 10. The suspension support assembly can be configured to support another portion of the rear suspension and wheel assembly.

III. Front and Rear Suspension and Wheel Assemblies

The vehicle 10 can include a front suspension and wheel assembly and a rear suspension and wheel assembly. As discussed above, the front suspension and wheel assembly can be connected to the front frame assembly 32. At least a portion of the rear suspension and wheel assembly can be mounted to the rear frame assembly 36.

Referring to FIG. 3, the suspension members 90L, 90R, 92L, 92R of the front suspension and wheel assembly can be configured as a double-wishbone suspension system (also referred to as upper and lower A-arms). Each of the suspension members 90L, 90R, 92L, 92R includes a pair of mounting points configured to be connected to a respective pair of the suspension brackets 100L, 100R, 102L, 102R. Each of the suspension members 90L, 90R, 92L, 92R can further include a single mounting point configured to be connected to a wheel hub or knuckle that can rotatably support a respective one of the front wheels 14L, 14R. However, exemplary embodiments are intend to include or otherwise cover suspension members that provide a different geometry and/or include multiple links, a strut, or other appropriate members in order to achieve the desired suspension performance so long as at least one of the suspension members on each side of the front frame assembly 32 is mounted to a suspension mounting bracket in accordance with the first upper mounting brackets 98L, 98R.

The rear suspension and wheel assembly can include the rear wheels 16L, 16R and at least one suspension member for each of the rear wheels 16L, 16R. The rear suspension and wheel assembly can include any appropriate suspension members, such as those described above for the front suspension and wheel assembly. Further, the rear suspension and wheel assembly can have the same type of suspension members as the front suspension and wheel assembly, or can have a different type of suspension members as compared to the front suspension and wheel assembly. For example, the rear suspension and wheel assembly can include a first rear suspension member, a second suspension member and a third suspension member connected on each side of the rear frame assembly 36. The first and second suspension members can be connected to each of the rear frame assembly 36 and a respective one of the rear wheels 16L, 16R. The third rear suspension member can be connected to a rear end portion of the main frame assembly 30 and connected to the respective one of the rear wheels 16L, 16R. In another exemplary embodiment, the rear suspension and wheel assembly can include the first, second and third suspension members described above, and can additionally include a fourth suspension member connected on each side of the rear frame assembly. However, exemplary embodiments are intended to include or otherwise cover a rear suspension and wheel assembly that includes at least one rear suspension member connected to the rear frame assembly 36.

IV. Steering Assembly

The vehicle 10 can include a steering assembly configured to transfer steering inputs from an operator in the passenger compartment of the main frame assembly 30 to the front wheels 14L, 14R. Referring to FIG. 3, the steering assembly can include a steering wheel, a steering column assembly 168 (shown in phantom), a steering rack assembly, and a pair of tie rods 170L, 170R.

The steering rack assembly can be mounted to and supported by the transverse frame assembly 82 of the front frame assembly 32. The tie rods 170L, 170R can be coupled to the steering rack assembly and to a respective one of the front wheels 14L, 14R. The steering column assembly 168 can pass through an opening in a plate of the transverse frame assembly 82 so that one end can be connected to the steering rack assembly and a second end can be located in the passenger compartment of the main frame assembly 30. The steering wheel can be connected to the second end of the steering column assembly 168. Either or both of the upper cross members 46, 48 can support an upper end of the steering column assembly 168 such that the steering wheel is located in the passenger compartment of the vehicle 10.

Each of the ties rods 170L, 170R can be pivotally coupled to a respective end of the steering rack and to the respective one of the front wheels 14L, 14R such that linear displacement of the steering rack results in pivoting of the front wheels 14L, 14R about a kingpin axis associated with the front wheels 14L, 14R.

V. Load and Kinetic Energy Management Apparatus

The features of the front frame assembly 32 as described can form a load and kinetic energy management apparatus. The load and kinetic energy management apparatus can distribute a load or kinetic energy throughout the front frame assembly 32. For example, when a load or kinetic energy is input to the front frame assembly 32 via one or both of the front wheels 14L, 14R as the vehicle 10 travels along an improved or unimproved path, load concentrations in any one particular component or portion of the front frame assembly 32 can be reduced or prevented. Further, the load and kinetic energy management apparatus can absorb and distribute a load or kinetic energy input via the front bumper assembly 34 such that deformation of the front frame assembly 32 can occur in a predetermined and controlled manner.

The load and kinetic energy management apparatus can include the first front frame members 76L, 76R, the second front frame members 78L, 78R and the intermediate frame members 80L, 80R configured by geometry and relative size and location, and connected to each other and to the main frame assembly 30, such that a load input by the front bumper assembly 34 to the first front frame members 76L, 76R can be transferred at least in part to each of the intermediate frame members 80L, 80R.

Figure 5:
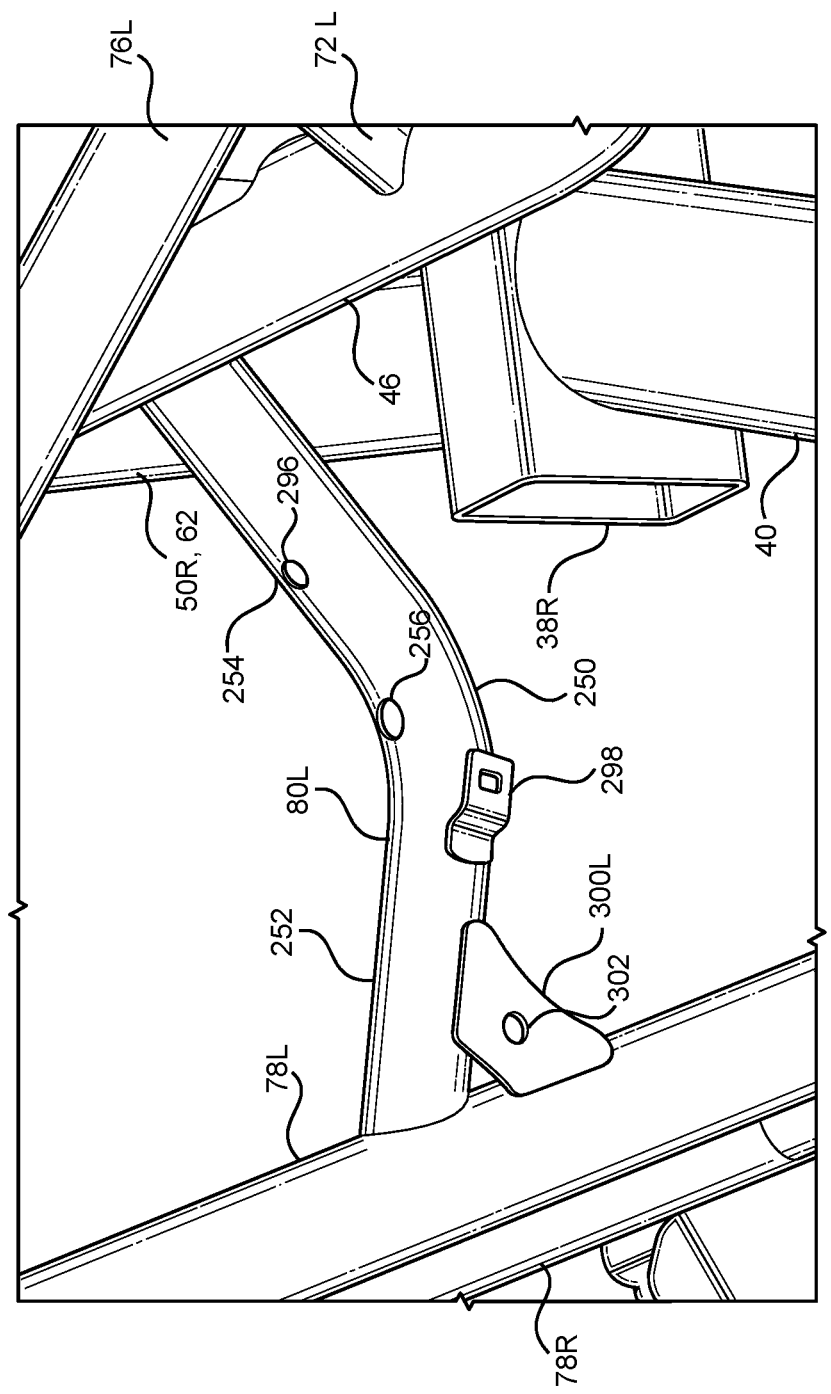
FIG. 5 is an enlarged perspective view of a portion of a front portion of the frame assembly of FIG. 2.

For example, as shown in FIGS. 4-6, each of the intermediate frame members 80L, 80R can include a bend (generally indicated at 250) at an intermediate portion of each of the frame members 80L, 80R. (The right-side intermediate member is obstructed from view in FIGS. 5 and 6). The bend 250 can be configured to facilitate deformation of each of the intermediate members 80L, 80R in a controlled and predictable manner and location if a predetermined load or kinetic energy is applied to each of the intermediate members 80L, 80R along the longitudinal direction L of the vehicle 10. The predetermined load or kinetic energy can be set at a threshold value that is the same as or different from the predetermined threshold set for the front bumper assembly 34. The arc length and radius of curvature of the bend 250 can be based on a desired amount of deformation, energy absorption and/or load/energy transmitted to the main frame assembly 30. The arc length and/or the radius of curvature of the bend 250 can be based on the distance in the longitudinal direction L between the second front frame members 78L, 78R and the first upper cross member 46.

Referring to FIG. 6, the bend 250 can be oriented to be convex toward a respective one of the front lower frame members 74L, 74R such that the bend 250 can be oriented to be convex toward a traveling surface on which the vehicle 10 travels. That is, the bend 250 can form a convex portion. Further, the bend 250 can form a concave portion that faces away from the respective one of the front lower frame members 74L, 74R. The concave portion can generally oppose the convex portion.

In the exemplary embodiment of FIGS. 2-10, the bend 250 is a smooth curve. However, exemplary embodiments are intended to include or otherwise cover the bend 250 that has an angular shape, or a bend 250 that includes a plurality of curved portion abutting each other, or a bend 250 that includes a plurality of straight portions abutting each other at an angle where each of the angles is the same or is unique, or a bend 250 that includes a combination of at least one curved portion and at least one straight portion.

The intermediate frame members 80L, 80R can be hollow tubes that are bent to form the bend 250. The intermediate frame members 80L, 80R can further include a pair of straight portions 252, 254. The first straight portion 252 can be connected to a respective one of the second front frame members 78L, 78R. The second straight portion 254 can be connected to the first upper cross member 46. The bend 250 can be located between and can extend from each of the straight portions 252, 254. However, exemplary embodiments are intended to include or otherwise cover intermediate frame members 80L, 80R that have a bend 250 that extends from one end to the other end of each of the intermediate frame members 80L, 80R, continuously, or at intervals.

In the exemplary embodiment of FIGS. 2-10, each of the intermediate members 80L, 80R is formed as a single, homogenous structure such that the straight portions 252, 254 are continuous with the bend 250. However, exemplary embodiments are intended to include or otherwise cover an intermediate member that includes a plurality of separate and distinct sections that are connected together in any appropriate manner such that intermediate members deform in a predictable and controlled manner. For example, an intermediate portion of 80L, 80R can be made from a relatively more elastic material as compared to opposite end portions of 80L, 80R. Alternatively, the intermediate portion can be made of material that is relatively more fragile, fracturable or frangible than opposite end portions of 80L, 80R.

Referring to FIG. 5, the load and kinetic energy management apparatus can include a tuning hole 256 in the intermediate frame members 80L, 80R. The tuning hole 256 can be formed in the bend 250. For example, the tuning hole 256 can be formed in the concave portion of the bend 250 at a location that is symmetrical with respect to the length of the end 250 in the longitudinal direction L of the vehicle 10. The tuning hole 256 can be configured to facilitate deformation of each of the intermediate members 80L, 80R in a controlled and predictable manner and location. The size and location of the tuning hole 256 can be based on the desired amount of deformation, energy absorption and/or load/energy transmitted to the main frame assembly 30.

Figure 10:
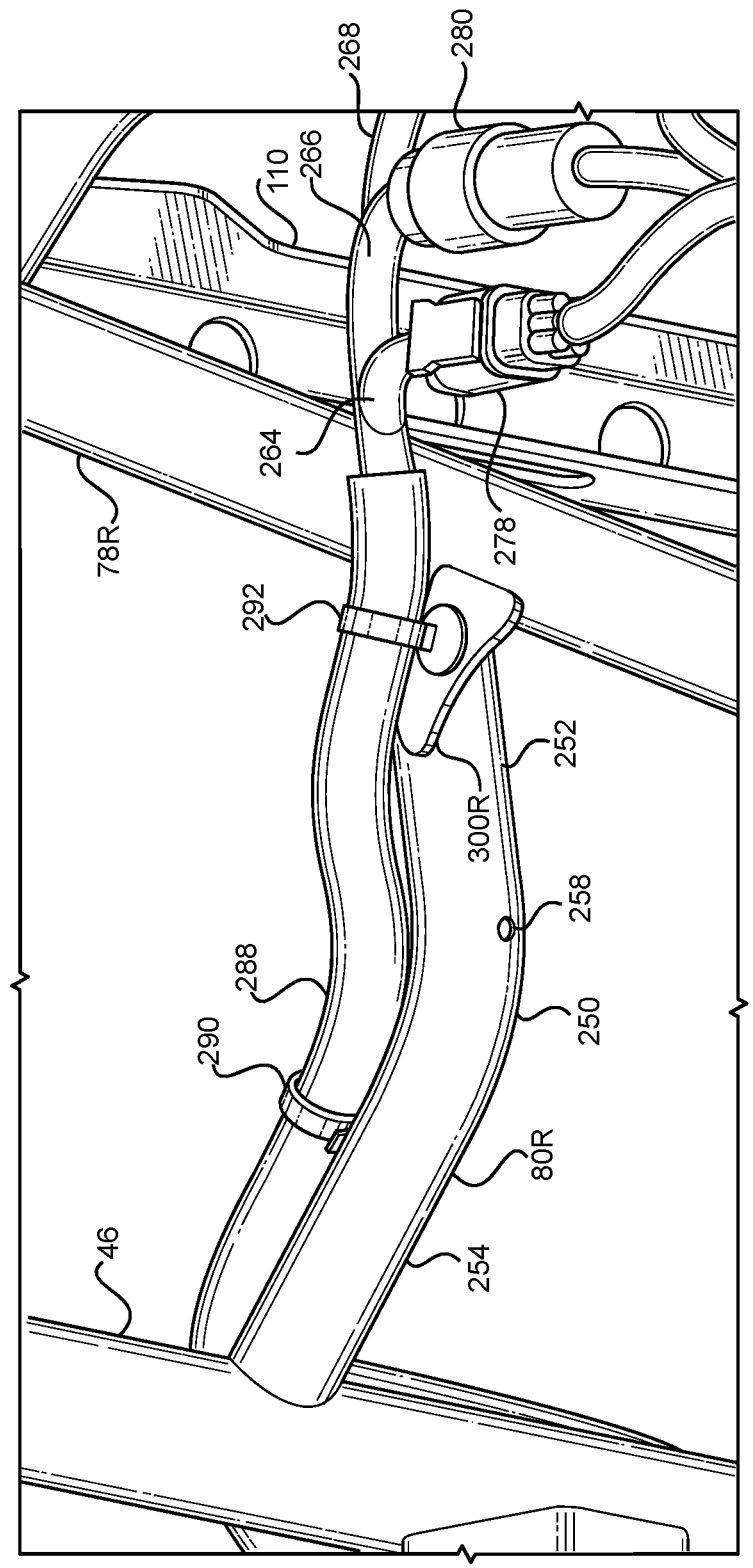
FIG. 10 is an enlarged and slightly tilted view of a portion of FIG. 9.

Referring to FIG. 10, each of the intermediate members 80L, 80R can include a drain hole 258. Since the intermediate members 80L, 80R can be hollow tubes, the drain hole 258 can permit any fluid that enters into the hollow tube via the tuning hole 256 to exit the hollow tube via the drain hole 258. The drain hole 258 can be formed in the bottom portion of each of the intermediate members 80L, 80R that is closest to the front lower frame members 74L, 74R in the vertical direction of the vehicle 10. The size and location of the drain hole 258 can be selected to provide the most efficient manner for evacuating any liquid that enters into the intermediate members 80L, 80R.

Further, the load and kinetic energy management apparatus can be configured such that a load or kinetic energy input into the front frame assembly 32 by the front suspension and wheel assembly on either side of the vehicle 10 can be distributed throughout both sides of the front frame assembly 32 via the front final drive assembly 88, and then distributed into the main frame assembly 30.

For example, a load or kinetic energy input by the left-side upper suspension member 90L can be transferred to the left-side first front frame member 76L. In turn, the left-side first front frame member 76L can transfer a portion of the load or kinetic energy input to the front lower frame member 74L. Further, the front final drive assembly 88 can be connected to the first front frame members 76L, 76R such that the front final drive assembly 88 can transfer a portion of the load or kinetic energy input by one of the left-side first front frame member 76L to the right-side first front frame member 76R. Subsequently, the right-side first front frame member 76R can transmit a portion of the load or kinetic energy input into the right-side front lower frame member 74R.

A similar example can occur with respect to the right-side upper suspension member 90R, and each of the lower suspension members 92L, 92R. Thus, the load and kinetic energy management apparatus can distribute a load or kinetic energy input by the front suspension and wheel assembly to both sides of the front frame assembly 32 such that each of the front lower frame members 74L, 74R can distribute a respective portion of the load or kinetic energy input by each of the suspension members 90L, 90R, 92L, 92R throughout the front frame assembly 32 and then into the main frame assembly 30.

In the exemplary embodiment described above, when following the load and energy distribution paths described above, the load and energy management apparatus can transmit a load or kinetic energy input to one of the first front frame members 76L, 76R to each of the front lower frame members 74L, 74R via the front final drive assembly 88 and a different one of the first frame members 74L, 74R. Further, the load and energy management apparatus can transmit a load or kinetic energy input by the front bumper assembly 34 to front frame assembly 32 such that the front frame assembly 32 can resist the load or kinetic energy input via the front bumper assembly 34 until the front bumper assembly 34 initially collapses in the longitudinal direction L of the vehicle 10. Further, at least one portion of the front frame assembly 32 can collapse in the direction toward the main frame assembly 30 if the load or kinetic energy continues to be inputted to the first front frame members 76L, 76R via the front bumper assembly 34 after the front bumper assembly 34 initially collapses. Accordingly, the frame assembly 18 of the vehicle 10 can provide rigidity sufficient to absorb and distribute a load or kinetic energy input by the front suspension and wheel assembly without undesirable deformation of the front frame assembly 32. Further, the frame assembly 18 of the vehicle 10 can provide an ability to absorb and distribute a load or kinetic energy input by the front bumper assembly 34 that can permit deformation of the front frame assembly 32 in a predetermined and controlled manner.

VI. Wire Harness Support

Referring to FIGS. 7-10, the intermediate frame members 80L, 80R also can be configured to support one or more wire harness assemblies that can provide electricity to components and/or systems mounted on or in the instrument panel assembly 248 such as but not limited to the aforementioned displays (also referred to as a combination meter, or as gauges), electrical switch(es), etc. The wire harness assemblies can also supply electrical power to components and/or systems mounted on the front frame assembly 32 such as the front final drive assembly 88 and a pair of headlight assemblies. For example, the vehicle 10 can include a front wire harness assembly 260 that passes into and through the instrument panel assembly 248 (omitted from FIGS. 7-10 for simplicity and clarity of the drawing views) mounted on the main frame assembly 30 and along the front frame assembly 32. The front wire harness assembly 260 can include a sheath 262, a plurality of electrical wires or cables 264, 266, 268, 270, 272, 274, 276 a plurality of connectors 278, 280, 282, 284, 286, a branch sheath 288 and a plurality of fasteners 290, 292, 294. The main sheath 262 can bundle the wires 264, 266, 268, 270, 272, 274, 276 into a single unit from which the wires can branch out in respective directions to reach the respective component(s) and/or system(s). The front wire harness assembly 260 can be divided into a plurality of sections. Some of the connectors 278, 280, 282, 284, 286 can electrically connect respective sections of the front wire harness assembly 260. Others of the connectors 278, 280, 282, 284, 286 can electrically connect the respective wire(s) to the respective component(s)/system(s). The branch sheath 288 can bundle the fifth, sixth and seventh wires 272, 274, 276 that branch from the main sheath 262. As will be discussed in more detail below, the fasteners 290, 292, 294 can secure respective portions of the front harness assembly 260 to respective portions of the front frame assembly 32.

Referring to FIGS. 5 and 7, each of the intermediate frame members 80L, 80R can include a clip hole 296. The clip hole 296 can be formed in an upper portion of each of the intermediate frame members 80L, 80R that is spaced from the tuning hole 256 and the bend 250. The clip hole 296 can be located between the tuning hole 250 and the end of each of the intermediate frame members 80L, 80R that abuts the first upper cross member 46.

The first fastener 290 can include a clamp portion and a base. The clamp portion can be wrapped around and tightened to the branch sheath 288. The clamp portion can be integrally formed with with or otherwise connected to the base. The base can include a mating portion that can be secured in the clip hole 296 of the right-side intermediate frame member 80R. Thus, the first, second and third wires 264, 266, 268 can be secured to and supported by the right-side intermediate frame member 80R.

Figure 8:
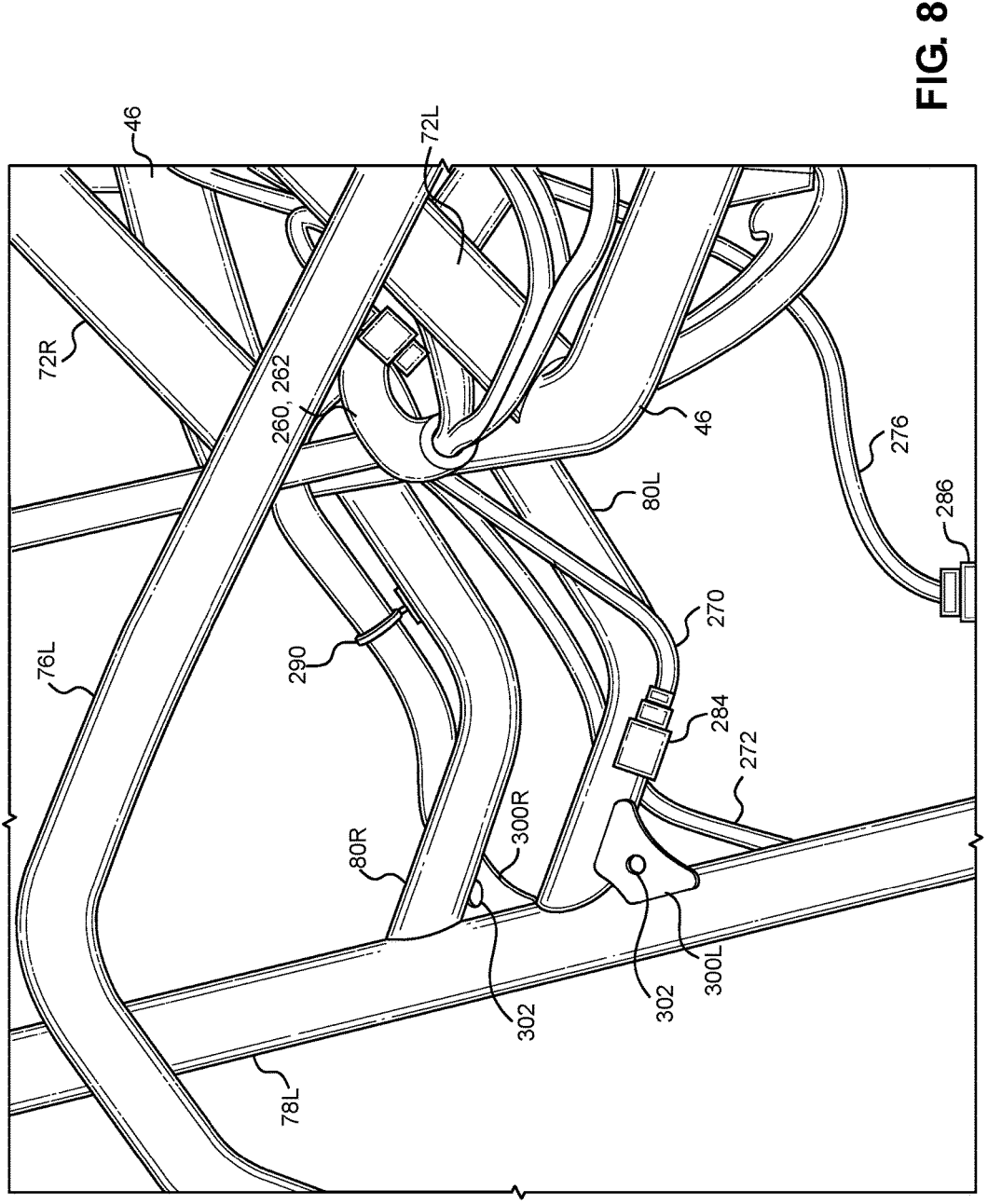
FIG. 8 is a perspective view from the left side of the frame assembly of FIG. 2 of a front portion of the frame assembly of FIG. 2 with wires of an exemplary wire harness assembly connected to the frame.

Referring to FIG. 5, the left-side intermediate frame member 80L can include a connector bracket 298. The connector bracket 298 can be mounted on a side portion of the intermediate frame member 80L that faces toward the exterior of the vehicle 10. The fourth connector 284 can be connected to an end of the fourth wire 270. Referring to FIG. 8, the fourth connector 284 can be secured to the connector bracket 298. Thus, the fourth wire 270 can be secured to and supported by the left-side intermediate frame member 80L.

The front frame assembly 32 can further include a pair of mounting brackets 300L, 300R. Each of the mounting brackets 300L, 300R can be connected to and can extend between a respective one of the second front frame members 78L, 78R and a respective one of the intermediate frame members 80L, 80R. Each of the mounting brackets 300L, 300R can include a clip hole 302.

Figure 9:
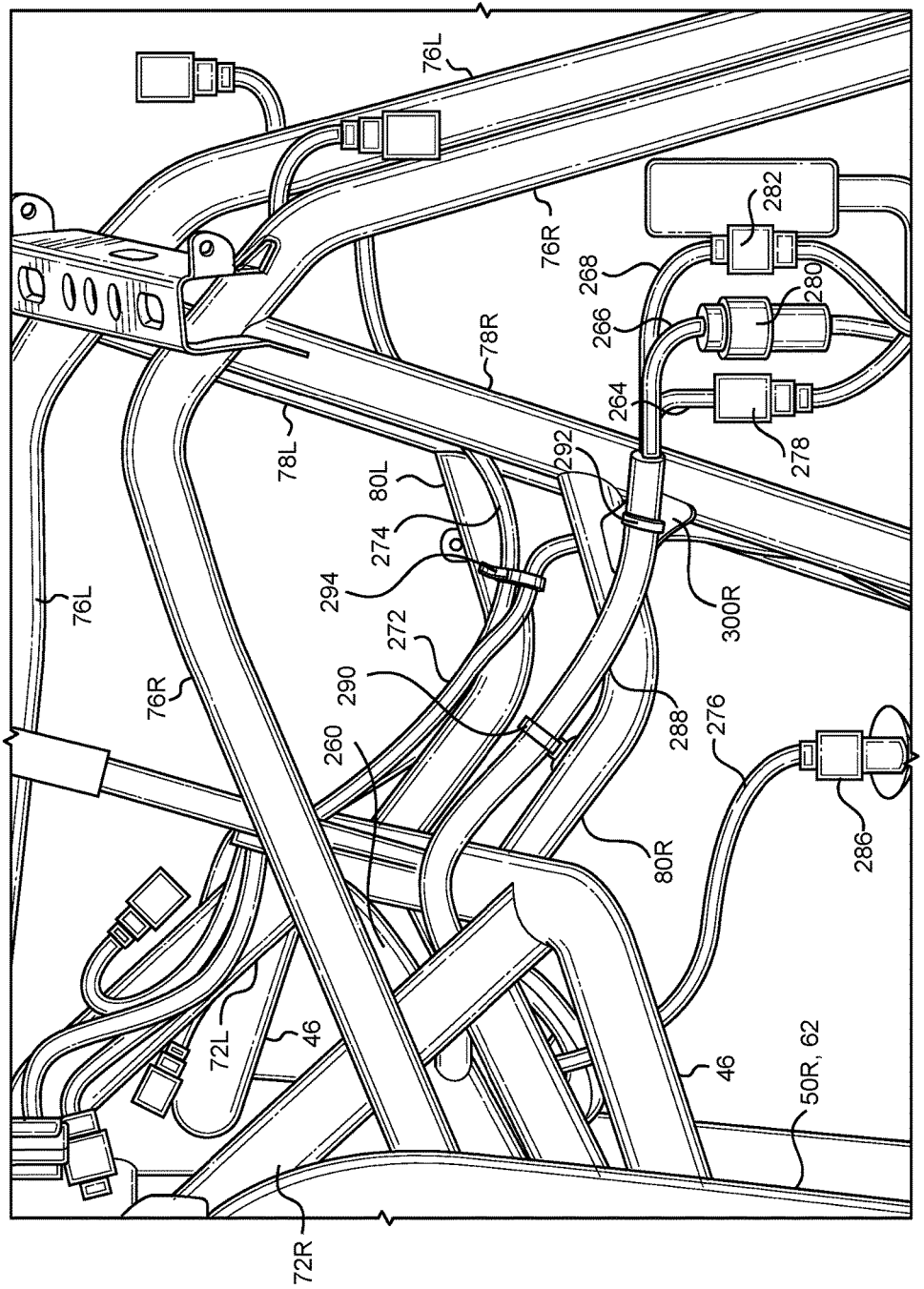
FIG. 9 is a perspective view from the right side of the frame assembly of FIG. 2 of a front portion of the frame assembly of FIG. 2.

The second fastener 292 can include a clamp portion and a base. Referring to FIGS. 9 and 10, the clamp portion can be wrapped around and tightened to the branch sheath 288 at a position that is spaced away from the first fastener 290. The clamp portion can be integrally formed with or otherwise connected to the base. The base can include a mating portion that can be secured in the clip hole 302 of the right-side mounting bracket 300R. Thus, the first second and third wires 264, 266, 268 can be supported by the right-side intermediate frame member 80L.

The third fastener 294 can include a clamp portion and a base. Referring to FIG. 9, the clamp portion can be wrapped around and tightened to the fifth and sixth wires 272, 274. The clamp portion can be integrally formed with or otherwise connected to the base. The base can include a mating portion that can be secured in the clip hole 302 of the left-side mounting bracket 300L. Thus, the fifth and sixth wires 272, 274 can be supported by the left-side intermediate frame member 80L.

VII. Alternative Embodiments

While certain embodiments of the invention are described above, and disclose a best mode for practicing the various inventive aspects, it should be understood that the invention can be embodied and configured in many different ways without departing from the spirit and scope of the invention.

For example, embodiments are disclosed above in the context of a vehicle 10 shown in FIG. 1. However, embodiments are intended to include or otherwise cover any type of vehicle disclosed above. For example, exemplary embodiments are intended to include or otherwise cover any type of vehicle that can travel on an improved surface such as but not limited to a paved road.

Exemplary embodiments are intended to include or otherwise cover any type of front frame assembly 32. In other words, exemplary embodiments are intended to cover any application of front frame assembly that can sustain load or kinetic energy inputs from a front suspension and wheel assembly while also being capable of responding in a predetermined and controlled manner to a load or kinetic energy input in the longitudinal direction of the vehicle 10. For example, one or both of the first and second frame members can be made from a plurality of parts or made as a unitary homogenous component.

Exemplary embodiments are intended to include any appropriate shape for each of the first and second frame members. Further, exemplary embodiments are intended to include the first frame members and the second frame members divided differently as compared to the first and second frame members described above. For example, exemplary embodiments are intended to include or otherwise cover a first frame member that terminates at a junction with the second frame member, and the second frame member includes a second end that is connected to the main frame assembly.

Exemplary embodiments are intended to include or otherwise cover the first frame member or the second frame connected to any appropriate portion of the main frame assembly.

Exemplary embodiments are intended to include or otherwise cover any type of front suspension and wheel assembly. For example, embodiments are disclosed in the context of an upper suspension member and a lower suspension member that are configured as A-arms (also referred to as wishbones). Exemplary embodiments are intended to include an upper suspension member that has a unique geometry compared to the lower suspension member. Exemplary embodiments are also intended to include an upper suspension member that has the same geometry compared to the lower suspension member. Further, exemplary embodiments are intended to include a front suspension and wheel assembly that includes one or more suspension members configured differently than the upper suspension member and the lower suspension member, and used in place of the upper suspension member and/or the lower suspension members.

Embodiments are disclosed above in the context of vehicle 10 shown in FIG. 1 having a front frame assembly that includes a front bumper assembly. However, embodiments are intended to include or otherwise cover any a vehicle that includes a rear frame assembly, a rear bumper assembly and a rear suspension and wheel assembly configured in a manner as described above with respect to the front frame assembly, the front bumper assembly and the front suspension and wheel assembly.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A frame assembly for a vehicle comprising:
  a main frame assembly defining a passenger compartment, and including,
    a pair of side frame members extending upwardly along a vertical direction of the vehicle, and
    a cross frame member extending in the transverse direction from one of the side frame members to a different one of the side frame members; and
  a front frame assembly including,
    a pair of front frame members, and
    a pair of intermediate frame members spaced apart from each other in the transverse direction of the vehicle, each of the intermediate frame members is connected to and extends from a respective one of the front frame members, each of the intermediate frame members is also connected to the cross member, and each of the pair of intermediate frame members includes a bend such that each of the intermediate frame members buckles in the longitudinal direction of the vehicle if a load or kinetic energy applied to each of the intermediate frame members in the longitudinal direction of the vehicle exceeds a predetermined threshold;

wherein the bend of each of the intermediate frame members is oriented to be convex toward a traveling surface on which the vehicle travels.

2. The frame assembly according to claim 1, further comprising:

a front bumper assembly connected to the front frame assembly such that the front frame assembly is located between the front bumper assembly and the main frame assembly, the front bumper assembly is configured to collapse if a load or kinetic energy is input to the front bumper assembly that exceeds a second predetermined threshold, wherein the intermediate frame members are configured to resist deformation when subjected to a load or kinetic energy input via the front bumper assembly until the front bumper assembly initially collapses in a direction toward the main frame assembly, and the intermediate frame members are further configured to collapse in the direction toward the main frame assembly if the load or the energy input continues to be applied to the front frame members via the front bumper assembly after the front bumper assembly initially collapses.

3. The frame assembly according to claim 1, wherein the front frame assembly further includes a pair of lower frame members connected to and extending from the main frame assembly in the longitudinal direction of the vehicle, each of the front frame members is connected to and extends upwardly from a respective one of the lower frame members, and the bend of each of the intermediate frame members is oriented to be convex toward a respective one of the lower frame members.

4. The frame assembly according to claim 1, wherein the bend of each of the intermediate frame members includes a concave portion and a tuning hole in the concave portion.

5. The frame assembly according to claim 4, wherein the front frame assembly further includes a pair of lower frame members connected to and extending from the main frame assembly in the longitudinal direction of the vehicle, each of the front frame members is connected to and extends upwardly from a respective one of the lower frame members, and each of the intermediate frame members includes a bottom portion that is a portion of the intermediate frame member that is closest to a respective one of the lower frame members in the vertical direction of the vehicle, and a drain hole is located in the bottom portion.

6. The frame assembly according to claim 1, wherein each of the intermediate frame members is a hollow tube.

7. The frame assembly according to claim 1, wherein the front frame assembly further includes:

a pair of lower frame members connected to and extending from the main frame assembly in the longitudinal direction of the vehicle, and a pair of first front frame members, each of the first front frame members is connected to and extends upwardly from a respective one of the lower frame members, each of the front frame members includes a first end connected to a respective one of the lower frame members and a second end connected to a respective one of the first front frame members such that each of the front frame members extends from the respective one of the lower frame members to the respective one of the first front frame members, and each of the intermediate frame members is connected to a respective one of the front frame members at a location that is between the first end and the second end.

8. The frame assembly according to claim 7, wherein the location on the respective one of the frame members is closer to the second end than to the first end.

9. The frame assembly according to claim 1, wherein each of the intermediate frame members is welded to the cross member and the respective one of the front frame members.

10. The frame assembly according to claim 1, wherein each of the intermediate frame members includes a pair of straight portions and the bend is located between the straight portions.

11. The frame assembly according to claim 1, further comprising:

a wire harness extending from the cross member to the front frame members, and the wire harness is connected to at least one of the intermediate frame members.

12. The frame assembly according to claim 11, wherein each of the intermediate frame members includes a clip hole adjacent to the bend, and the wire harness includes a clip that is mounted in the clip hole.

13. A vehicle comprising:

a main frame assembly defining a passenger compartment of the vehicle, and including, a pair of main frame members extending in a longitudinal direction of the vehicle, and spaced apart in a transverse direction of the vehicle, a pair of side frame members, each of the side frame members is connected to and extends upwardly along a vertical direction of the vehicle from a front end portion of a respective one of each of the main frame members, and a cross frame member extending in the transverse direction of the vehicle from one of the side frame members to a different one of the side frame members;

a rear frame assembly connected to and extending from a rear end portion of the main frame members in a longitudinal direction of the vehicle, the rear frame assembly is configured to mount a rear suspension and wheel assembly; and a front frame assembly connected to and extending from a front end portion of the main frame assembly of the vehicle such that the main frame assembly extends between the front frame assembly and the rear frame assembly in a longitudinal direction of the vehicle, the front frame assembly is configured to mount a front suspension and wheel assembly, the front frame assembly including, a pair of lower frame members connected to the main frame assembly, the pair of lower frame members extending from the main frame assembly in the longitudinal direction of the vehicle, and the lower frame members are spaced apart from each other in the transverse direction of the vehicle, a pair of front frame members, each of the front frame members is connected to and extends upwardly from a respective one of the lower frame members, and a pair of intermediate frame members spaced apart from each other in the transverse direction of the vehicle, each of the intermediate frame members is connected to and extends from a respective one of the front frame members, each of the intermediate frame members is also connected to the cross member, and each of the pair of intermediate frame members includes a bend such that each of the intermediate frame members buckles in the longitudinal direction of the vehicle if a load or kinetic energy applied to each of the intermediate frame members in the longitudinal direction of the vehicle exceeds a predetermined threshold, wherein the bend of each of the intermediate frame members includes a concave portion and a tuning hole in the concave portion.

14. The vehicle according to claim 13, further comprising a front bumper assembly connected to the front frame assembly such that the front frame assembly is located between the front bumper assembly and the main frame assembly, the front bumper assembly is configured to collapse if a load or kinetic energy is input to the front bumper assembly that exceeds another predetermined threshold, wherein the intermediate frame members are configured to resist deformation when subjected to a load or kinetic energy input via the front bumper assembly until the front bumper assembly initially collapses in a direction toward the main frame assembly, and the intermediate frame members are further configured to collapse in the direction toward the main frame assembly if the load or the energy input continues to be applied to the front frame members via the front bumper assembly after the front bumper assembly initially collapses.

15. The frame assembly according to claim 13, wherein the bend of each of the intermediate frame members is oriented to be convex toward a traveling surface on which the vehicle travels.

16. The frame assembly according to claim 13, wherein each of the intermediate frame members includes a pair of straight portions and the bend is located between the straight portions.

17. The frame assembly according to claim 13, further comprising a wire harness extending from the cross member to the front frame members, and the wire harness is connected to at least one of the intermediate frame members.

18. An all-terrain vehicle comprising:
a main frame assembly including,
a pair of main frame members extending in a longitudinal direction of the vehicle, and spaced apart in a transverse direction of the vehicle,
a roll cage connected to each of the main frame members at locations on each of the main frame members that are spaced apart in the longitudinal direction of the vehicle, the roll cage is configured to define a passenger compartment, and the roll cage includes a pair of cage side members, each of the cage side members is connected to and extends upwardly along a vertical direction of the vehicle from a front end portion of a respective one of each of the main frame members, and a cross frame member extending in the transverse direction of the vehicle from one of the cage side members to a different one of the cage side members;
an instrument panel assembly connected to the cross frame member and extending in the transverse direction of the vehicle between the cage side members;
a rear frame assembly connected to and extending from a rear end portion of the main frame members in a longitudinal direction of the vehicle, and connected to and extending from a rear end portion of the roll cage, and the rear frame assembly is configured to mount a rear suspension and wheel assembly; and
a front frame assembly connected to and extending from a front end portion of the main frame assembly of the vehicle such that the main frame assembly extends between the front frame assembly and the rear frame assembly in a longitudinal direction of the vehicle, the front frame assembly is configured to mount a front suspension and wheel assembly, the front frame assembly including,
a pair of lower frame members connected to the main frame assembly, the pair of lower frame members extending from the main frame assembly in the longitudinal direction of the vehicle, and the lower frame members are spaced apart from each other in the transverse direction of the vehicle,
a pair of front frame members, each of the front frame members is connected to and extends upwardly from a respective one of the lower frame members,
a pair of intermediate frame members spaced apart from each other in the transverse direction of the vehicle, each of the intermediate frame members is connected to and extends from a respective one of the front frame members, each of the intermediate frame members is also connected to the cross member, and each of the pair of intermediate frame members includes a bend such that each of the intermediate frame members buckles in the longitudinal direction of the vehicle if a load or kinetic energy applied to each of the intermediate frame members in the longitudinal direction of the vehicle exceeds a predetermined threshold, and
each of the front frame members includes a first end connected to a respective one of the lower frame members and a second end, and
each of the intermediate frame members is connected to a respective one of the front frame members at a location that is between the first end and the second end.

19. The all-terrain vehicle according to claim 18, further comprising a front bumper assembly connected to the front frame assembly such that the front frame assembly is located between the front bumper assembly and the main frame assembly, the front bumper assembly is configured to collapse if a load or kinetic energy is input to the front bumper assembly that exceeds another predetermined threshold, wherein the intermediate frame members are configured to resist deformation when subjected to a load or kinetic energy input via the front bumper assembly until the front bumper assembly initially collapses in a direction toward the main frame assembly, and the intermediate frame members are further configured to collapse in the direction toward the main frame assembly if the load or the energy input continues to be applied to the front frame members via the front bumper assembly after the front bumper assembly initially collapses.

20. The all-terrain vehicle according to claim 18, wherein the front frame assembly further includes:
- a pair of first front frame members, each of the first front frame members is connected to and extends upwardly from a respective one of the lower frame members, and
- the second end of each of the front frame members is connected to a respective one of the first front frame members such that each of the front frame members extends from the respective one of the lower frame members to the respective one of the first front frame members.

\* \* \* \* \*